No. 640,607. Patented Jan. 2, 1900.
T. E. WARDWELL.
COMBINED COASTER AND TRUING GAGE.
(Application filed Mar. 30, 1899.)
(No Model.)
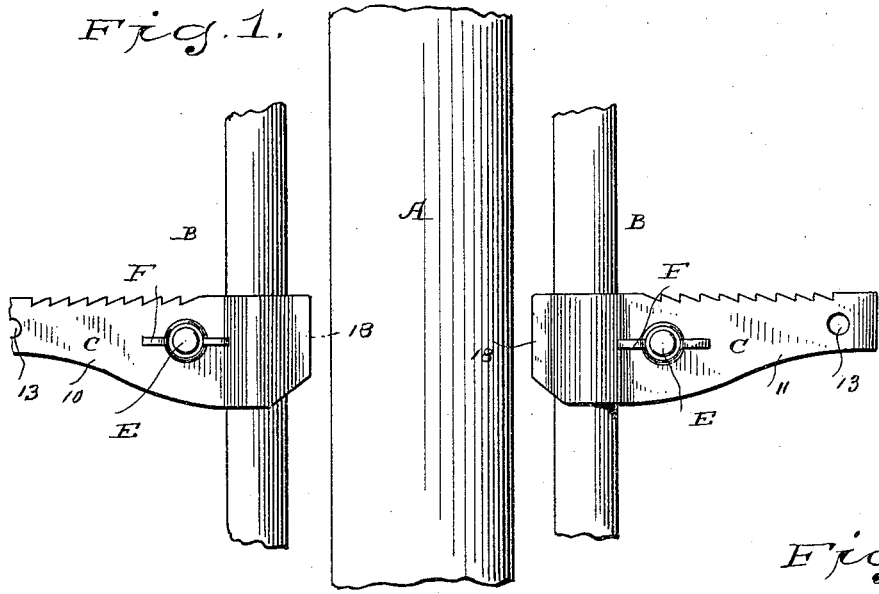
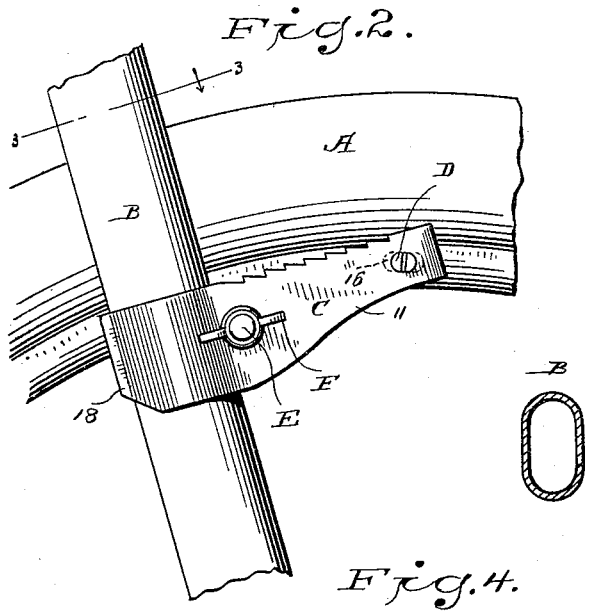
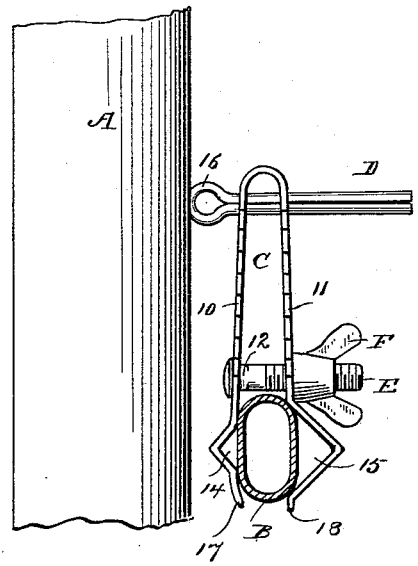
WITNESSES
H. A. Pauls
N. Elwood
INVENTOR
Theodore E. Wardwell
By A. M. Wooster

UNITED STATES PATENT OFFICE.

THEODORE E. WARDWELL, OF STAMFORD, CONNECTICUT.

COMBINED COASTER AND TRUING-GAGE.

SPECIFICATION forming part of Letters Patent No. 640,607, dated January 2, 1900.

Application filed March 30, 1899. Serial No. 711,175. (No model.)

*To all whom it may concern:*

Be it known that I, THEODORE E. WARDWELL, a citizen of the United States, residing at Stamford, county of Fairfield, State of Connecticut, have invented a new and useful Combined Coaster and Truing-Gage, of which the following is a specification.

My invention has for its object to provide a combined coaster and gage for truing the wheels of bicycles which shall be so constructed that while not adding appreciably to the cost of a coaster a truing-gage also shall be provided which may be attached to either the front or rear fork of any bicycle, so as to enable a rider to true a wheel at any place on the road, if necessary, and without other tools than a spoke-wrench.

With this end in view I have devised the novel combined coaster and truing-gage of which the following description, in connection with the accompanying drawings, is a specification, reference characters being used to designate the several parts.

Figure 1 is a front elevation showing coasters in their normal position on the front fork of a bicycle; Fig. 2, a side elevation showing the device in use as in truing the front wheel of a bicycle; Fig. 3, a section on the line 3 3 in Fig. 2, the wheel and the truing-gage appearing in plan; and Fig. 4 is a detail view, corresponding with Fig. 3, illustrating a modification in which a thumb-screw is substituted for a split pin.

A denotes the front wheel of a bicycle, and B the front fork.

My novel device consists, essentially, of a body C, an adjustable gage D, and a bolt E, having a thumb-nut F, by which the body may be locked in place on one side of the front fork of a bicycle to serve as a coaster, or on either side of the front fork when used to carry a gage for truing the front wheel, or on either side of the rear fork when used to carry a gage for truing the rear wheel. The body consists of two arms 10 and 11, yieldingly connected, and is ordinarily struck out in a single piece from sheet metal. One of the arms—in the present instance arm 10—is provided with an angular opening to receive the angular portion 12 of the shank of the bolt, and the other arm is provided with a hole through which the threaded portion of the bolt passes freely, the thumb-nut being turned down on the outer side of the arm and causing the two arms to clamp the fork in either position in which the device is used. For the purposes of this specification I have described the ordinary and well-known means of attaching coasters in place on the front fork. It should be understood, however, that so far as my present invention is concerned the coasters may be attached in place in any convenient or preferred manner. Near the outer end of the body—*i. e.*, near where the arms unite—I provide holes 13 in both arms to receive a gage which is adapted to intersect the line of motion of a bicycle-wheel. This gage may be a split pin, as in Figs. 2 and 3, or a thumb-screw, as in Fig. 4. By "split pin" I mean any kind of a pin having two parts or sides secured together at one end and adapted to spring apart at the other end, so as to make the pin self-locking in any position in which it is placed. In the present instance I have shown a split pin made from a piece of half-round wire bent at its mid-length to form a head 16, which in use lies toward the wheel, as clearly shown in Fig. 3. If a thumb-screw is used as a gage, the holes 13 are of course threaded to receive it. An important feature in the construction of the arms is that the sockets provided near the free ends of the arms to grasp the forks of the bicycle differ markedly in size. One arm—in the present instance arm 10—is shown as provided with a relatively small socket 14, and the other arm is shown as provided with a relatively large socket 15. This difference in the size of the sockets makes no difference in attaching the bodies in place for use as coasters, but is of importance in attaching the bodies in position to carry a gage for truing wheels. By placing the relatively small socket on the inner side of the fork, as in Fig. 3, all danger of the socket being in the way of the wheel is avoided. This difficulty could not be overcome otherwise unless the forks were made unnecessarily wide or unless the wheels were unusually small. In order to insure that the arms will grip all sizes and shapes of forks firmly, so as to hold the body rigidly under all circumstances, whether used on the front or rear fork or as a coaster or to hold a wheel-truing gage, I provide a curved extension 17 of arm 10 beyond the socket 14 and an extension 18 of arm 11 beyond the socket 15. These extensions are so shaped as to take firm hold upon all sizes and shapes of forks.

It will of course be apparent that either body of a pair may be used upon either side of either fork, the small socket 14 being placed upon the inner side of the fork and the body extended either forward or backward, as may be necessary to place the smaller socket upon the inner side.

Having thus described my invention, I claim—

1. A combined coaster and truing-gage consisting of a body having arms adapted to engage a bicycle-fork and to be turned thereon for the purpose set forth, means for clamping said arms upon the fork in different positions and an adjustable gage adapted to be carried by the body near the outer end thereof and to intersect the line of motion of a bicycle-wheel.

2. A coaster comprising a body consisting of two yieldingly-connected arms provided with sockets adapted to engage a bicycle-fork and holes 13, a bolt and thumb-nut by which the arms are caused to clamp the fork and an adjustable gage adapted to engage holes 13 and to intersect the line of motion of a bicycle-wheel.

3. A device of the character described comprising a body having arms one of which is provided with a relatively small socket, the other with a relatively large socket, said arms having holes 13, means for securing said body in place and a split pin adapted to engage holes 13 and to intersect the line of motion of a bicycle-wheel.

4. A device of the character described comprising a body having arms one of which is provided with a relatively small socket 14 and a curved extension 17, the other with a relatively large socket 15 and extension 18 to adapt the arms to clamp the varying curves of bicycle-forks, means for attaching the body in place and a gage adapted to be carried by the body.

In testimony whereof I affix my signature in presence of two witnesses.

THEODORE E. WARDWELL.

Witnesses:
J. CLINTON HOYT,
HELEN L. HOYT.